US011354585B2

(12) United States Patent
Tagra et al.

(10) Patent No.: US 11,354,585 B2
(45) Date of Patent: Jun. 7, 2022

(54) COGNITIVE DETECTION OF CLOUD SERVICE FORECAST

(71) Applicant: International Business Machines Corporation, Armonk, NY (US)

(72) Inventors: Ankur Tagra, Bangalore (IN); Harish Nayak, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 16/357,455

(22) Filed: Mar. 19, 2019

(65) Prior Publication Data

US 2020/0302317 A1   Sep. 24, 2020

(51) Int. Cl.
*G06N 5/04* (2006.01)
*G06F 16/906* (2019.01)
*G06N 20/00* (2019.01)
*G06F 9/50* (2006.01)

(52) U.S. Cl.
CPC .......... *G06N 5/043* (2013.01); *G06F 9/5027* (2013.01); *G06F 16/906* (2019.01); *G06N 20/00* (2019.01)

(58) Field of Classification Search
None
See application file for complete search history.

(56) References Cited

U.S. PATENT DOCUMENTS

| 9,213,540 | B1 * | 12/2015 | Rickey | G06Q 10/00 |
|---|---|---|---|---|
| 10,021,037 | B2 | 7/2018 | Ferris | |
| 2016/0034835 | A1 | 2/2016 | Levi | |
| 2018/0060205 | A1 | 3/2018 | Raj | |

OTHER PUBLICATIONS

Munteanu VI, Fortis TF, Negru V. Service lifecycle in the cloud environment. In 2012 14th International Symposium on Symbolic and Numeric Algorithms for Scientific Computing Sep. 26, 2012 (pp. 457-464). IEEE. (Year: 2012).*
Mastelic et al., "Predicting Resource Allocation and Costs for Business Processes in the Cloud," IEEE 11th World Congress on Services, Jun. 2015, New York, NY, 8 pages.
Borkowski et al., "Predicting Cloud Resource Utilization," 2016 IEEE/ACM 9th International Conference on Utility and Cloud Computing, Dec. 2016, Shanghai, China, 6 pages.
Ngo et al., "Bounded Expectations: Resource Analysis for Probabilistic Programs," PL'17, Jan. 1-3, 2017, New York, NY, USA, 41 pages.
Ullah et al., "Adaptive Resource Utilization Prediction System for Infrastructure as a Service Cloud," Computational Intelligence and Neuroscience, vol. 2017, Article ID 4873459, Jul. 2017, 12 pages.

* cited by examiner

*Primary Examiner* — Vincent Gonzales
(74) *Attorney, Agent, or Firm* — Van Leeuwen & Van Leeuwen; Jorge R. Maranto

(57) ABSTRACT

An approach is provided in which an information handling system uses historical time durations of deprecated resources to compute an increased probability window. The increased probability window corresponds to an increase in probability that a currently active resource is likely to be active at a future point in time. Next, the information handling system identifies a set of active resources that have active time durations within the increased probability window and, in turn, marks the set of resources as a set of forecasted active resources. In turn, the information handling system generates a resource cost forecast based on the set of forecasted active resources.

20 Claims, 7 Drawing Sheets

COGNITIVE DETECTION OF CLOUD SERVICE FORECAST

BACKGROUND

Cloud-computing providers offer various services according to different models, such as Infrastructure as a Service (IaaS), Platform as a Service (PaaS), and Software as a Service (SaaS). These models offer increasing abstraction and are typically portrayed as a layers in a stack, where IaaS is a bottom layer, PaaS is a middle layer, and SaaS is a top layer. The models may also be used independent of each other.

A cloud environment may include software at all three layers (IaaS, PaaS, and SaaS), include information associated with a public cloud provider account, and/or include an entire "rack" or datacenter in an on premise private cloud. The way in which a cloud environment operates is typically subject to a numerous set of configurable parameters that typically include hardware selection (CPU, disk, network cards, memory, routers/switches, etc.), firmware level selection, BIOS configuration, operating system selection for each hardware component, operating system configuration, virtualization software selection and configuration, and pattern deployment software/configuration. Cloud service providers typically charge organizations based on the amount of resources they utilize.

Cloud resources are typically utilized over long periods of time for running different applications/services due to the stability of the applications/services. One of the challenges organizations face today is estimating upcoming costs of cloud services/cloud providers and to allocate the respective budget. An organization typically incurs unexpected expenses and a gap in estimated/planned service consumption. In the competitive world of cloud services, cost forecasting is a key role in an organization's growth and sustainability.

BRIEF SUMMARY

According to one embodiment of the present disclosure, an approach is provided in which an information handling system uses historical time durations of deprecated resources to compute an increased probability window. The increased probability window corresponds to an increase in probability that a currently active resource is likely to be active at a future point in time. Next, the information handling system identifies a set of active resources that have active time durations within the increased probability window and, in turn, marks the set of resources as a set of forecasted active resources. In turn, the information handling system generates a resource cost forecast based on the set of forecasted active resources.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
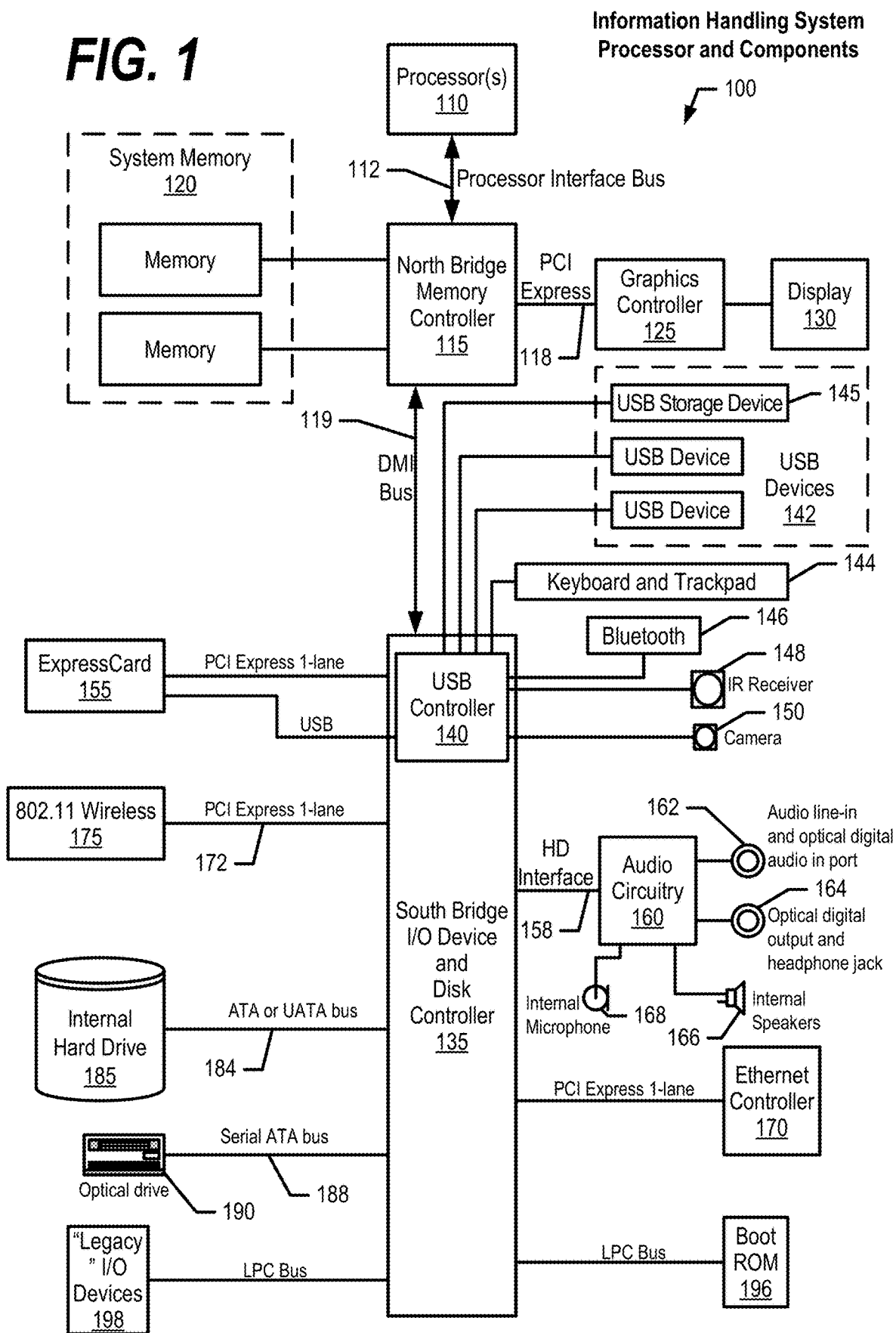
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
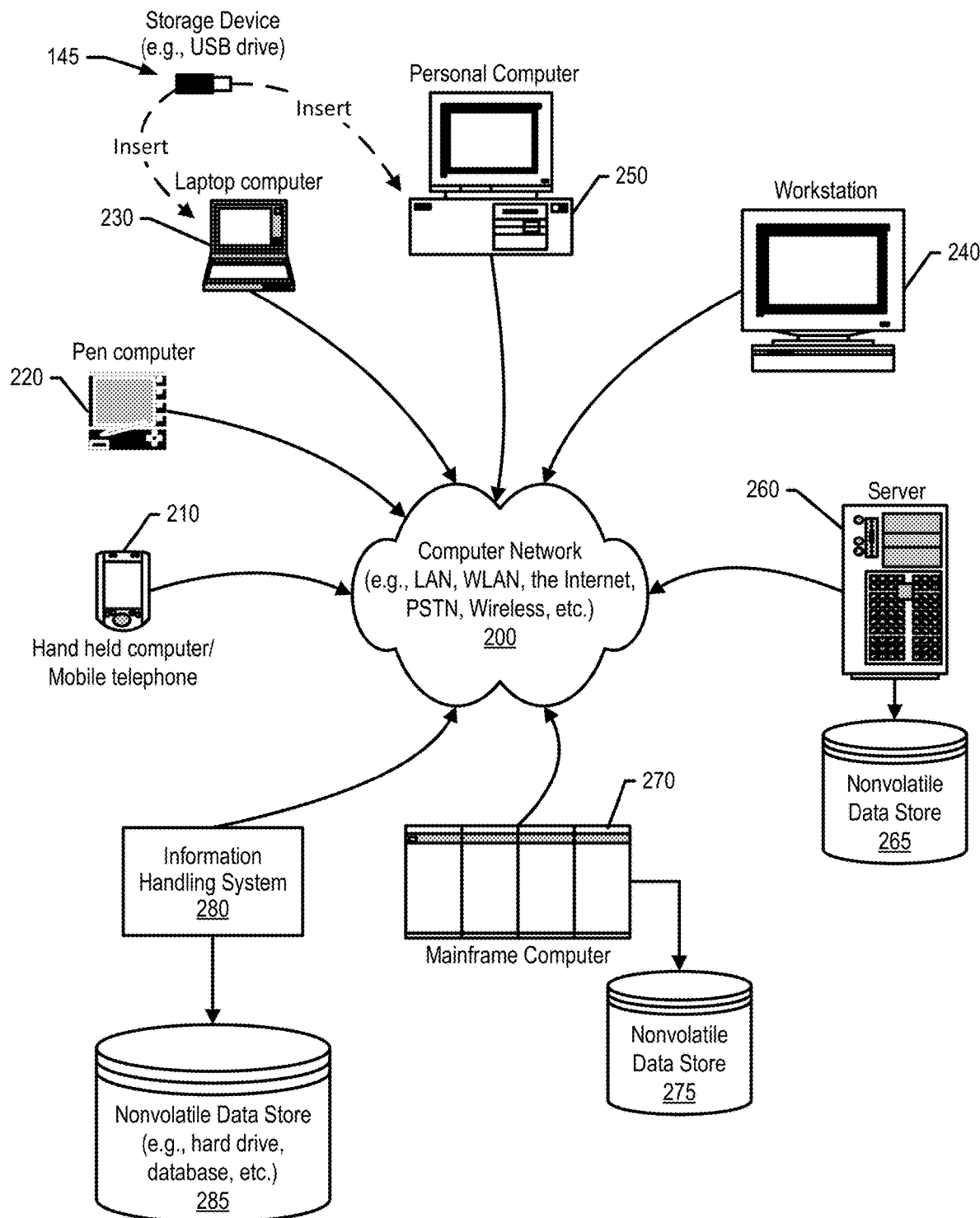
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Current cost forecast solutions implement a linear regression approach that does not maintain where resource life cycle prediction information. As such, resource utilization trends and dependency information are neither captured nor utilized for future cost forecasting. FIGS. 3 through 7 depict an approach that can be executed on an information handling system that utilizes historical deprecated resource utilization data to forecast which active resources will still be active at a future point in time.

First, the information handling system calculates historical time durations for which a depreciated resource was active and then trains a cognitive engine using the historical time durations. Next, the information handling system uses the trained cognitive engine to determine an increased probability window corresponding to active time durations of currently active resources that are likely to be active in the future. In one embodiment, the cognitive engine improves in accuracy over time by retraining itself using newly deprecated resource utilization data. Then, the information handling system defines high impact currently active resource clusters that, in one embodiment, clusters the resource based on K-Means clustering. The information handling system then calculates mean active time durations of the clusters and mean operational frequencies of the clusters. The information handling system then identifies those clusters whose mean active time duration lies in the increased probability window and prioritizes the clusters based on their mean operational frequency. The information handling system selects the top k clusters as high impact resource clusters and designates the currently active resources corresponding to the high impact resource clusters as forecasted active resources. Finally, the information handling system computes a cloud services cost forecast based on the forecasted active resources.

As discussed herein, the information handling system cognitively predicts resource life cycle parameters (age of resource, active time) and supports a continuous probabilistic model for capturing the behavior of consumer de-commissioning a resource/blueprint based on a resource's age. The information handling system also dynamically calculates operational thresholds for the resource utilization prediction and uses the resource utilization age and the operational threshold to predict the active resources for the next cycle (e.g., month) and the cost forecast for the next cycle.

Figure 3:
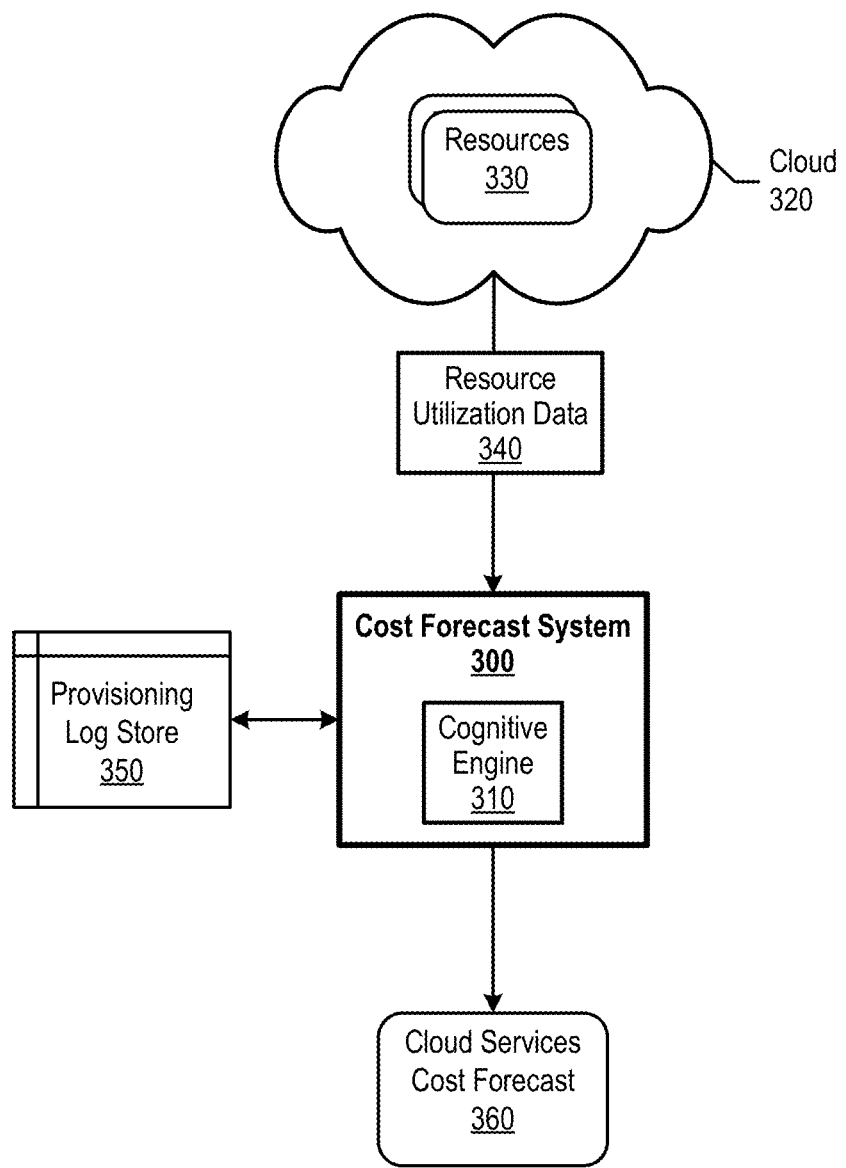
FIG. 3 is an exemplary high level diagram depicting a cost forecast system generating a cloud services cost forecast by forecasting future active resources based on deprecated resource utilization data.

FIG. 3 is an exemplary high level diagram depicting a cost forecast system generating a cloud services cost forecast by forecasting future active resources based on deprecated resource utilization data. Cloud 320 includes resources 330. Over time, some of resources 330 are provisioned and eventually deprecated. Cost forecast system 300 captures resource utilization data 340 that includes resource information such as the provisioning time, deprecated times, and the amount of occurrences that the resources were in operation over the span of their lifecycle. Cost forecast system 300 stores the deprecated resource utilization data 340 in provisioning log store 350.

Cost forecast system 300 then uses the deprecated resource utilization data stored in provisioning log store 350 to train cognitive engine 310. During the training process, cognitive engine 310 is trained based on historical time durations and historical relative operation frequencies of the deprecated resources (see FIG. 5 and corresponding text for further details). In turn, cognitive engine 310 generates an increased probability window (lambda 1 and lambda 2) corresponding to an increase in probability window of time that a resource is likely to be active at a future point in time based on the resources current age (see FIGS. 6, 7, and corresponding text for further details). In one embodiment, cognitive engine 310 improves itself over time by using a feed backward propagation network to determine the life cycle of cloud resources 330.

Once cognitive engine 310 is trained, cost forecast system 300 clusters information of currently active resources in resources 330 and identifies those clusters whose mean active time duration falls within the increased probability window. Then, cost forecast system 300 selects one of the identified clusters that has a highest mean operational frequency and designates the currently active resources corresponding to the selected cluster as forecasted active resources (likely to be active at a future point in time) (see FIGS. 6, 7, and corresponding text for further details). In turn, cost forecast system 300 computes a cost forecast of the forecasted active resources and generates cloud services cost forecast 360, which a user evaluates to forecast costs for an upcoming time period.

Figure 4:
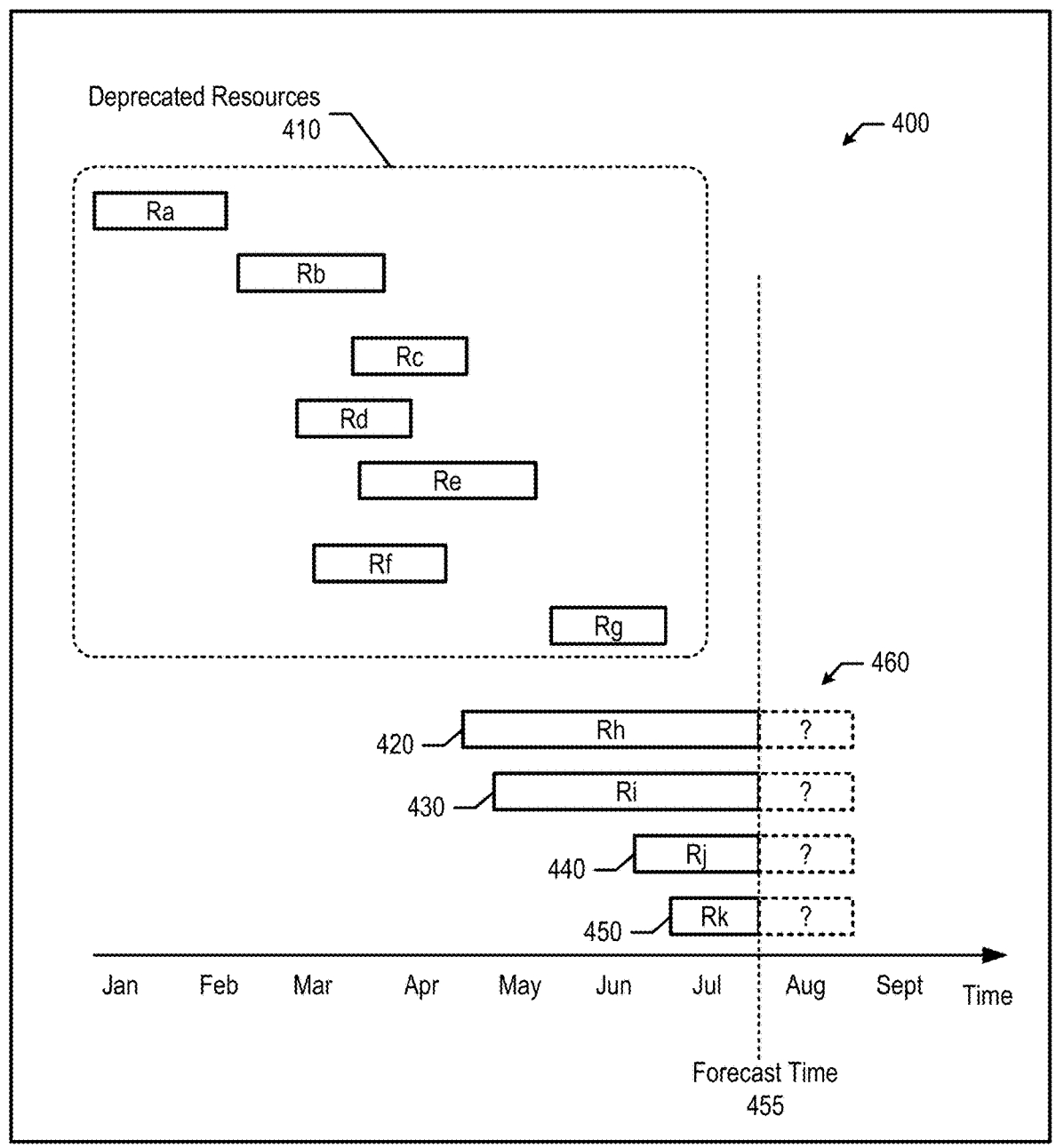
FIG. 4 is an exemplary timeline showing deprecated resources, active resources, and which active resources will continue to be active at a future point in time.

FIG. 4 is an exemplary timeline showing deprecated resources, active resources, and which active resources will continue to be active at a future point in time. Timeline 400 shows a forecasting event at a certain point in time (forecast time 455) between the month of July and August (e.g., July 31st). As discussed herein, cost forecast system 300 computes historical time durations for each of deprecated resources 410 based on the amount of time between its provisioned time and its deprecated time, and then uses the historical time durations to train cognitive engine 310 (see FIG. 5 and corresponding text for further details). Then, cost forecast system 300 uses cognitive engine 310 to provide an increased probability window that, in turn, is utilized to forecast which of currently active resources 420, 430, 440, and 450 will be active at a future point in time 460 (e.g., August) (see FIGS. 6, 7, and corresponding text for further details).

Figure 5:
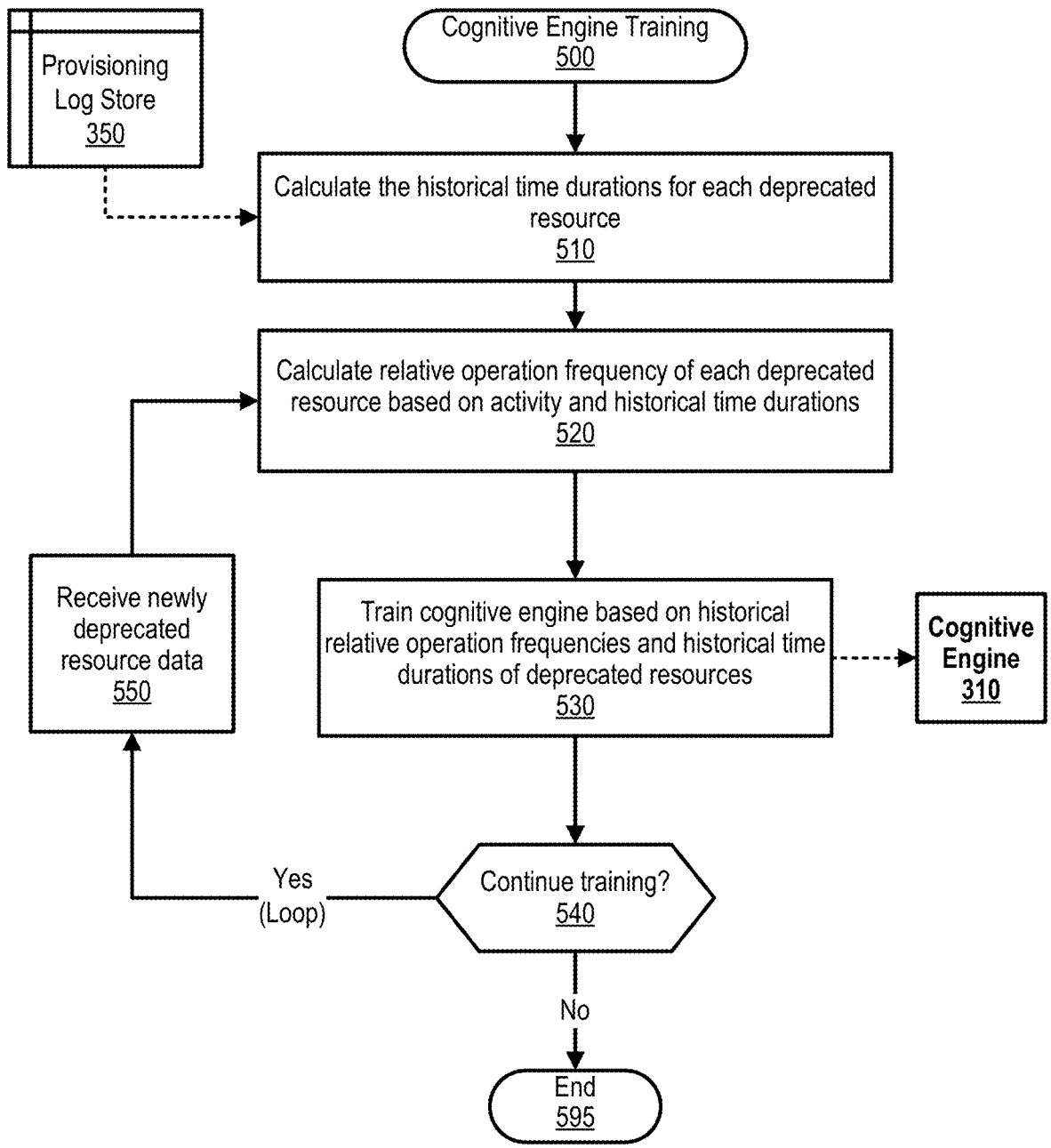
FIG. 5 is an exemplary flowchart showing steps taken to train a cognitive engine using deprecated resource utilization data.

FIG. 5 is an exemplary flowchart showing steps taken to train a cognitive engine using deprecated resource utilization data. FIG. 5 processing commences at 500 whereupon, at step 510, the process calculates a historical time duration for each deprecated resource based on deprecated resource utilization data stored in provisioning log store 350.

At step 520, the process calculates a relative operation frequency of each deprecated resource based on activity and historical time durations. For example, resources={Rx, Ry}, their operations in time (t1,t2) have a frequency of Rx=3, Ry=1. Then, at step 530, the process trains cognitive engine 310 based on the historical relative operation frequencies and historical time durations of the deprecated resources.

The process then determines as to whether to continue training cognitive engine 310 (decision 540). If the process should continue training cognitive engine 310, then decision 540 branches to the 'yes' branch which loops back to receive (step 550) and process newly deprecated resource utilization data from recently deprecated resources. This looping continues until the training should terminate, at which point decision 540 branches to the 'no' branch exiting the loop. FIG. 5 processing thereafter ends at 595.

Figure 6:
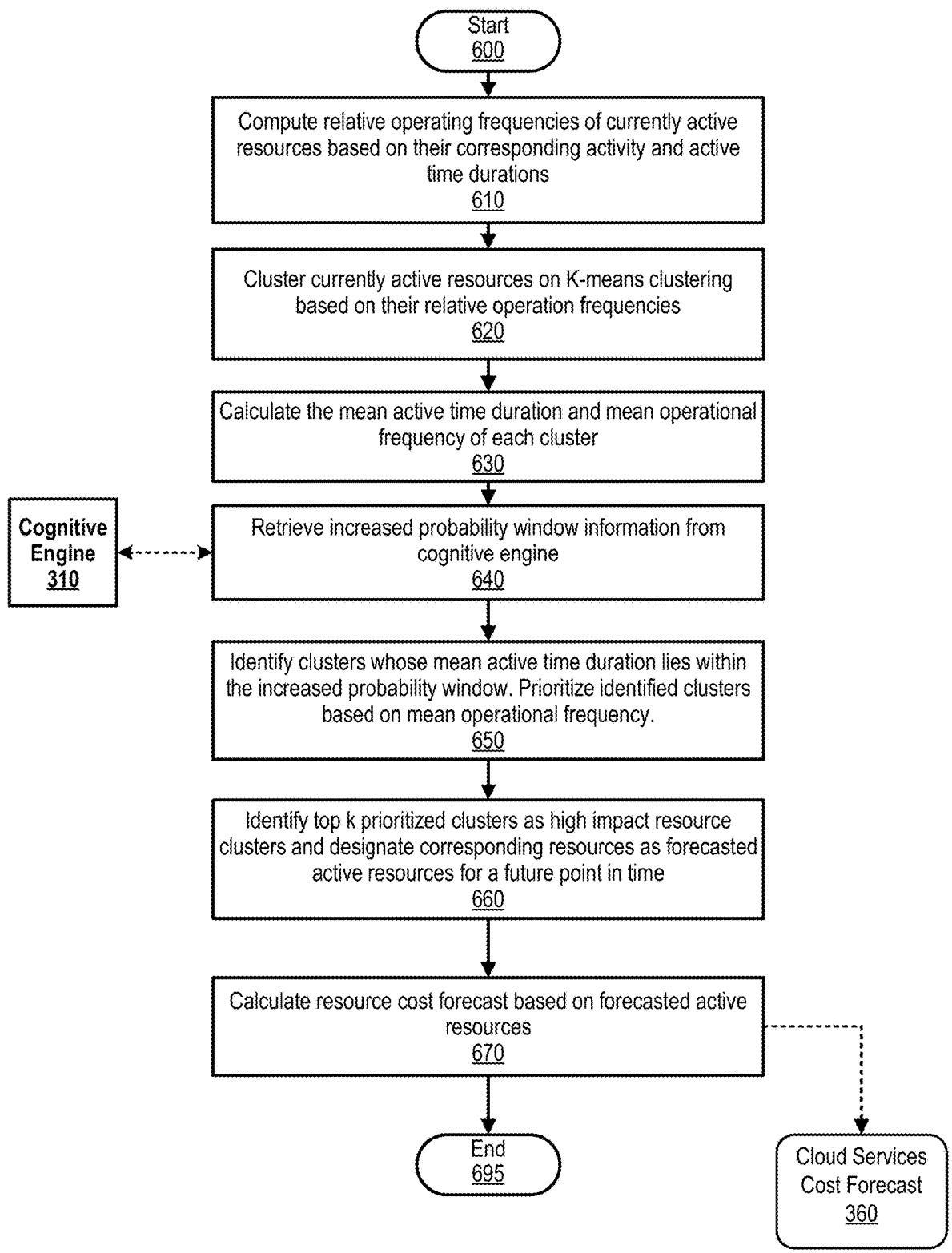
FIG. 6 is an exemplary flowchart showing steps taken to forecast active resources at a future time using a cognitive engine trained on deprecated resource utilization data.

FIG. 6 is an exemplary flowchart showing steps taken to forecast active resources at a future time using a cognitive engine trained on deprecated resource utilization data. FIG. 6 processing commences at 600 whereupon, at step 610, the process computes relative operating frequencies of currently active resources based on their corresponding activity and active time durations. At step 620, in one embodiment, the process clusters the currently active resources using K-means clustering based on their relative operation frequencies.

At step 630, the process calculates mean active time durations and mean operational frequencies of each cluster. For example, given that cluster 1=Ra, Rb, and using the resource utilization data below:

| Resource | Operation frequency | Time (in related analysis) | Time interval |
|---|---|---|---|
| Ra | 10 | 20 units | 20-40 |
| Rb | 35 | 40 units | 10-50 |
| Rc | 5 | 10 units | 10-20 |
| Rd | 25 | 30 units | 0-30 |

Cluster 1 mean operation frequency=(10+35)/2=22.5
Cluster 1 mean active time duration of 20-40 and 10-50: (20+10)/2=15 and (40+50)/2=45=>(15-45)

Figure 7:
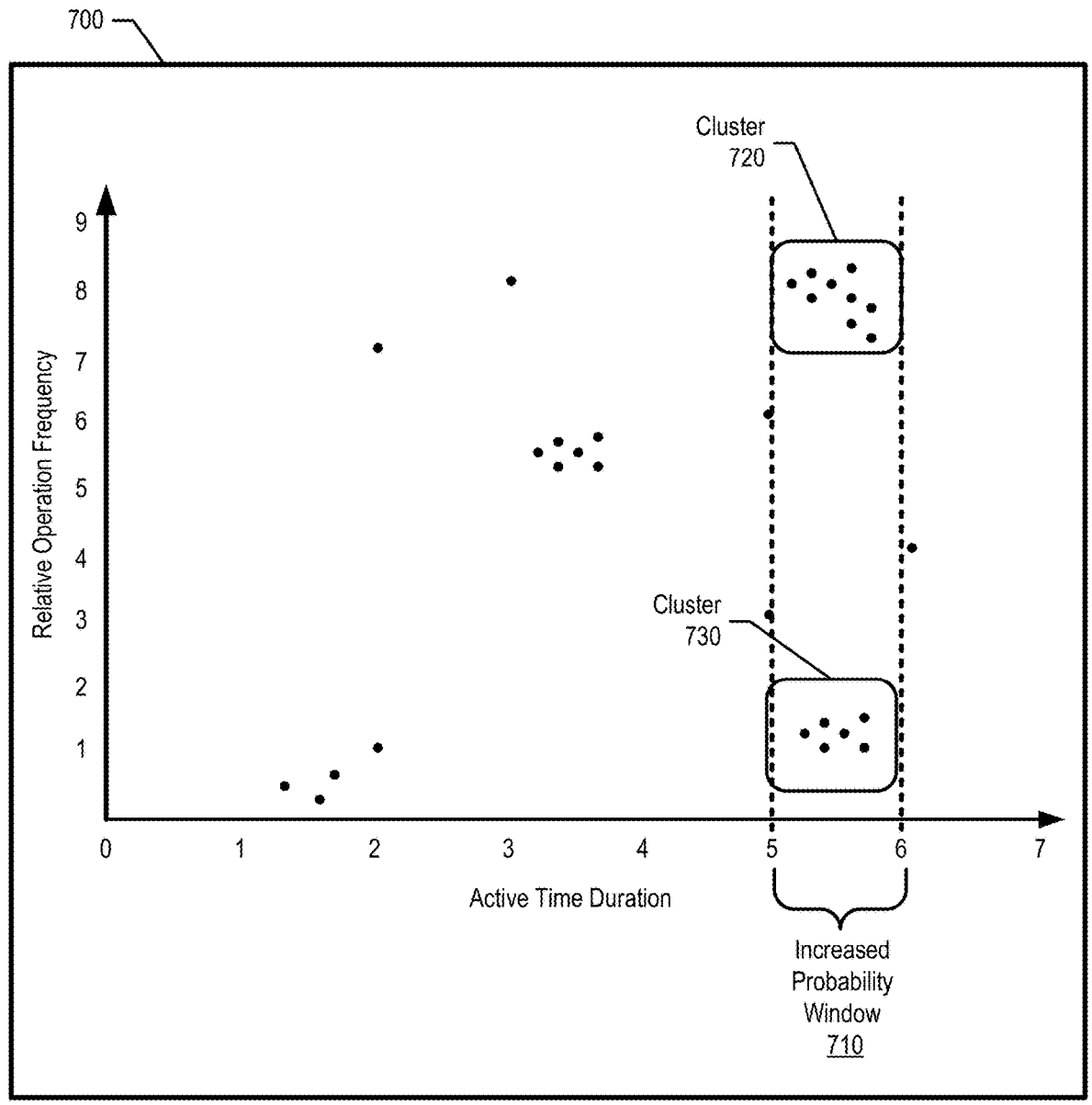
FIG. 7 depicts an exemplary graph showing an increased probability window plotted on an active time duration axis to identify high impact resource clusters.

At step 640, the process retrieves the increased probability window information from cognitive engine 310 and, at step 650, the process identifies clusters whose mean active time duration lies within the increased probability window (see FIG. 7, clusters 720 and 730). Using the example above, cognitive engine 310 proves an increased probability window of (25-55), cluster 1's mean active time duration of 20-40 falls within the increased probability window.

Then, the process prioritizes the identified clusters based on their corresponding mean operational frequency. Continuing with the example above, the overall mean frequency operational threshold=(10+35+5+25)/4=18.75 and, therefore, cluster 1 mean operation frequency (22.5) is greater than the overall mean frequency operational threshold (18.75), so cluster 1 is determined to be an active cluster.

At step 660, the process identifies the top k prioritized clusters as high impact resource clusters and designates their corresponding active resources as forecasted active resources. At step 670, the process calculates a resource cost forecast based on the forecasted active resources (e.g., using current monthly costs of the forecasted active resources). FIG. 6 processing thereafter ends at 695.

FIG. 7 depicts an exemplary graph showing an increased probability window plotted on an active time duration axis to identify high impact resource clusters. As discussed herein, cost forecast system 300 trains cognitive engine 310 using deprecated resource utilization data. In turn, cognitive engine 310 generates increased probability window 710. Increased probability window signifies an increased probability that currently active resources whose active time duration falls within the window will be active at a future point in time.

Clusters 720 and 730 are clusters of currently active resources whose mean active time duration falls within increased probability window 710. As can be seen, cluster 720 has a higher mean operational frequency than cluster 730 and, therefore, currently active resources within cluster 720 are designated as forecasted active resources and are used to compute cloud services cost forecast 360. In one embodiment, cost forecast system 300 uses multiple clusters within increased probability window 710 based on configuration parameters. In this embodiment, cluster 720 and cluster 730 are used to compute cloud services cost forecast 360.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   training a probabilistic model based on a plurality of historical time durations of a plurality of deprecated resources;
   computing a probability window using the trained probabilistic model that is trained based on the plurality of historical time durations of the plurality of deprecated resources, wherein the probability window corresponds to a future point in time at which a resource is likely to be active;
   selecting, from a plurality of currently active resources, a set of forecasted active resources in response to determining that the set of forecasted active resources correspond to a set of active time durations within the probability window;
   generating a resource cost forecast based on the set of forecasted active resources; and
   utilizing the resource cost forecast to estimate a future cost of one or more cloud services.

2. The method of claim 1 wherein the selecting further comprises:
   determining an operational frequency of each of the plurality of currently active resources, resulting in a plurality of operational frequencies;
   determining a plurality of active time durations of the plurality of currently active resources, wherein the plurality of active time durations comprise the set of active time durations; and
   clustering the plurality of currently active resources into a plurality of clusters based on the plurality of operational frequencies and the plurality of active time durations.

3. The method of claim 2 further comprising:
   computing a mean active time duration and a mean operational frequency of each of the plurality of clusters;
   identifying one or more of the plurality of clusters whose mean active time duration falls within the increased probability window; and
   selecting one of the identified one or more clusters with the mean operational frequency that is highest out of the identified one or more clusters, wherein the selected cluster comprises the set of forecasted active resources.

4. The method of claim 3 further comprising:
   selecting a different cluster from the identified one or more clusters that exceeds an operational frequency threshold, wherein the different cluster comprises a different set of forecasted resources; and
   using the set of forecasted active resources and the different set of forecasted active resources to generate the resource cost forecast.

5. The method of claim 2 wherein the plurality of active time durations of the plurality of currently active resources are based on a plurality of provisioning times of the plurality of currently active resources and a forecast time of the selecting of the set of forecasted active resources.

6. The method of claim 1 further comprising:
   computing a new historical time duration of a newly deprecated resource; and
   retraining the trained probabilistic model using the new historical time duration.

7. The method of claim 1 wherein the currently active resources are cloud resources currently provisioned in a cloud environment.

8. An information handling system comprising:
one or more processors;
a memory coupled to at least one of the processors;
a set of computer program instructions stored in the memory and executed by at least one of the processors in order to perform actions of:
  training a probabilistic model based on a plurality of historical time durations of a plurality of deprecated resources;
  computing a probability window using the trained probabilistic model that is trained based on the plurality of historical time durations of the plurality of deprecated resources, wherein the probability window corresponds to a future point in time at which a resource is likely to be active;
  selecting, from a plurality of currently active resources, a set of forecasted active resources in response to determining that the set of forecasted active resources correspond to a set of active time durations within the probability window;
  generating a resource cost forecast based on the set of forecasted active resources; and
  utilizing the resource cost forecast to estimate a future cost of one or more cloud services.

9. The information handling system of claim 8 wherein the processors perform additional actions comprising:
  determining an operational frequency of each of the plurality of currently active resources, resulting in a plurality of operational frequencies;
  determining a plurality of active time durations of the plurality of currently active resources, wherein the plurality of active time durations comprise the set of active time durations; and
  clustering the plurality of currently active resources into a plurality of clusters based on the plurality of operational frequencies and the plurality of active time durations.

10. The information handling system of claim 9 wherein the processors perform additional actions comprising:
  computing a mean active time duration and a mean operational frequency of each of the plurality of clusters;
  identifying one or more of the plurality of clusters whose mean active time duration falls within the increased probability window; and
  selecting one of the identified one or more clusters with the mean operational frequency that is highest out of the identified one or more clusters, wherein the selected cluster comprises the set of forecasted active resources.

11. The information handling system of claim 10 wherein the processors perform additional actions comprising:
  selecting a different cluster from the identified one or more clusters that exceeds an operational frequency threshold, wherein the different cluster comprises a different set of forecasted resources; and
  using the set of forecasted active resources and the different set of forecasted active resources to generate the resource cost forecast.

12. The information handling system of claim 9 wherein the plurality of active time durations of the plurality of currently active resources are based on a plurality of provisioning times of the plurality of currently active resources and a forecast time of the selecting of the set of forecasted active resources.

13. The information handling system of claim 8 wherein the processors perform additional actions comprising:
  computing a new historical time duration of a newly deprecated resource; and
  retraining the trained probabilistic model using the new historical time duration.

14. The information handling system of claim 8 wherein the currently active resources are cloud resources currently provisioned in a cloud environment.

15. A computer program product stored in a computer readable storage medium, comprising computer program code that, when executed by an information handling system, causes the information handling system to perform actions comprising:
  training a probabilistic model based on a plurality of historical time durations of a plurality of deprecated resources;
  computing a probability window using the trained probabilistic model that is trained based on the plurality of historical time durations of the plurality of deprecated resources, wherein the probability window corresponds to a future point in time at which a resource is likely to be active;
  selecting, from a plurality of currently active resources, a set of forecasted active resources in response to determining that the set of forecasted active resources correspond to a set of active time durations within the probability window;
  generating a resource cost forecast based on the set of forecasted active resources; and
  utilizing the resource cost forecast to estimate a future cost of one or more cloud services.

16. The computer program product of claim 15 wherein the information handling system performs further actions comprising:
  determining an operational frequency of each of the plurality of currently active resources, resulting in a plurality of operational frequencies;
  determining a plurality of active time durations of the plurality of currently active resources, wherein the plurality of active time durations comprise the set of active time durations; and
  clustering the plurality of currently active resources into a plurality of clusters based on the plurality of operational frequencies and the plurality of active time durations.

17. The computer program product of claim 16 wherein the information handling system performs further actions comprising:
  computing a mean active time duration and a mean operational frequency of each of the plurality of clusters;
  identifying one or more of the plurality of clusters whose mean active time duration falls within the increased probability window; and
  selecting one of the identified one or more clusters with the mean operational frequency that is highest out of the identified one or more clusters, wherein the selected cluster comprises the set of forecasted active resources.

18. The computer program product of claim 17 wherein the information handling system performs further actions comprising:
  selecting a different cluster from the identified one or more clusters that exceeds an operational frequency threshold, wherein the different cluster comprises a different set of forecasted resources; and
  using the set of forecasted active resources and the different set of forecasted active resources to generate the resource cost forecast.

19. The computer program product of claim 16 wherein the plurality of active time durations of the plurality of currently active resources are based on a plurality of provisioning times of the plurality of currently active resources and a forecast time of the selecting of the set of forecasted active resources.

20. The computer program product of claim 15 wherein the information handling system performs further actions comprising:
  computing a new historical time duration of a newly deprecated resource; and
  retraining the trained probabilistic model using the new historical time duration.

* * * * *